3,411,922
METHOD OF PRODUCING BONELESS COOKED CHICKEN BREASTS IN CANS

Michael Eder, Bel Air, Md., assignor to Schluderberg-Kurdle Co., Inc., Baltimore, Md., a corporation of Maryland
No Drawing. Continuation-in-part of application Ser. No. 217,536, Aug. 17, 1962. This application May 31, 1966, Ser. No. 553,614
1 Claim. (Cl. 99—187)

ABSTRACT OF THE DISCLOSURE

A boneless chicken breast product consisting essentially of ground chicken breasts and chicken breast skins and seasonings and preservatives characterized and distinguished by the absence of added binder materials which inherently retains its shape when heated and a process for producing the produce are disclosed.

---

This invention relates generally to the production of canned poultry products and particularly to a method and procedure for manufacturing boneless cooked chicken breasts in cans, and the product thereof, and constitutes a continuation-in-part of my copending application, Ser. No. 217,536, filed Aug. 17, 1962, entitled "Method of Producing Boneless Cooked Chicken Breasts in Cans," now abandoned.

Heretofore, canned poultry products have had limited commercial success due to apparent imitation-like taste, structure, and appearance of the processed meats. Probably the most significant factor in the production of canned poultry meats which develops an imitation-like appearance and taste in the product is the binder which is necessary for many purposes in the canning process. If a binder is not employed in the process of manufacturing such products, the meat will crumble and fall apart when removed from the can or container. Such crumbling of the product is not desirous for the making of cold-cut dishes, sandwiches, and so forth from the canned product and furthermore, does not give the appearance of solid chicken meat, especially that of the breast of the chicken. Since a binder is necessary, it then becomes a problem of employing it in the production of canned poultry without taking away any of the appeal of the meat because of its presence.

The binder, as heretofore employed in the canning processes of poultry, would produce a gelatinous-like filler between the pieces of meat. Also, a mass of the binder usually separates from the canned product and forms a shell around the outside of the meat. Such structures are, of course, unpleasant to the eye, especially since gelatinous-like substances are not associated with poultry meats. Binders which segregate into lumps and give the appearance of being a gelatin or a fatty substance would cause one to consider the product of an imitation. Also, since prior processes for these products have required the use of large quantities of binder, the resultant product gives the appearance of having very little meat in proportion to the binder. A purchaser of such products is not interested in the binder, and, therefore, the larger the ratio, the more displeased he becomes with the product. Furthermore, many binders have a rubbery taste and texture which distracts from the good qualities of the chicken meat.

Canned poultry products also have had other not so appealing characteristics which have distracted from their commercial success. In many previous manufacturing techniques the meat is cooked in such a manner that the majority of the flavor is lost. This practice reduces the moisture content resulting in a dry and tasteless product. The addition of water to the product during the processing would tend to increase the moisture content, however, the taste would still be lacking and some of the water would escape from the meat after canning and would be trapped in the can. Artificial flavoring has been used to overcome the taste problem when the natural moisture is cooked from the chicken, however, the resultant product did not have the true chicken taste.

It is, therefore, an object of this invention to provide a canned boneless cooked chicken which is not imitation in appearance or taste.

It is another object of the invention to provide a canned poultry product which does not contain large amounts of binder thus providing a more natural product.

Another object of the instant invention is to provide a canned poultry product which does not contain artificial flavorings.

Still another object of the present invention is to provide a process for the manufacture of boneless cooked chicken breasts which will hold the natural moisture and flavor within the meat.

A still further object of the invention is the provision of a product which may, when prepared in accordance with the instant inventive concept, be stored without deterioration in the absence of refrigeration.

These and other objects and features of this invention will be more fully realized and understood from the following detailed description.

The exemplification of the instant invention will be drawn to the process of manufacturing canned chicken breasts, however, it is to be understood that other poultry may be canned according to the same processes.

The chicken breasts are first boned by any suitable means; that is, the meat is separated from the bone. The skin is removed from the larger pieces of breasts and is retained on the smaller pieces. This is significant since the smaller pieces of breast usually have less fatty skin than the skins of the larger pieces. The breasts, including the retained skin, are then ground to a particle size allowing emulsification and the skin which has been retained on the smaller pieces of breast acts as the sole binder in the resultant product. The amount of skin retained in the process depends upon how much binder is required to produce the desired results and may be varied according to individual tastes of the producer. The ground breasts including the simultaneously ground skin are then placed in a mixer with seasonings such as spice (pepper), salt, and sugar and a preservative such as sodium nitrate and/or sodium nitrite and monosodium glutamate is added to produce the novel canned product of this invention. Suitable proportions are as follows:

| | Percent |
|---|---|
| Chicken breasts including retained skin | 97.80 |
| Salt | 2.00 |
| Sugar | 0.05 |
| Pepper | 0.019 |
| Monosodium glutamate | 0.05 |
| Sodium nitrate | 0.04 |
| Sodium nitrite | 0.04 |

The ground breasts and binder are thoroughly mixed with the seasonings and the monosodium glutamate and preservative to produce a homogeneous batch which is then pressed into cans. The cans are then evacuated and sealed, after which the product is cooked for four and one-half to five hours until an internal temperature of approximately 170° Fahrenheit is reached. After cooking for the prescribed time and at the proper temperature, the cans are removed from the cooker and stored in a cooler at between 28 and 32° F. for a period of 8 to 16 hours.

The process above described results in a pasteurized product which may be successfully stored under refrigerated conditions for long periods.

Under certain conditions, it is desirable that a sterilized product be provided, which may be stored for an indefinite period without refrigeration. Under these conidtions, the same ingredients are mixed, canned and sealed in the same manner but the product is cooked at a higher temperature for a shorter period of time.

In regard to the cooking time it has been found that the size of the can is important to the resultant. For example: A 12 ounce can measuring approximately 3⅞ x 2⅛ by 3¼ inches if cooked at a temperature of 235° F. for approximately 1 hour and five minutes produces a sterile product having all of the highly desirable qualities of the previously described product, which may be stored indefinitely without refrigeration.

Similarly a 1½ pound can measuring approximately 5¾ x 4 x 2¹¹⁄₁₆ inches cooked for approximately 1 hour and 30 minutes at 235° F. produces a sterile product of high quality which requires no refrigeration.

However, in the larger sizes, such for example, a three pound can, which normally measures approximately 4 x 3½ by 6½ inches, a cooking time of two hours and 25 minutes at 235° F. is necessary to raise the interior temperature to the extent necessary to effect sterilization. While this produces no deleterious effect on the taste or quality of the product, a protracted cooking time at this elevated temperature has been found to discolor the product, resulting in a less appetizing appearance, and resulting in lower sales.

For this reason the sterile product which may be stored without refrigeration is generally, though not essentially, restricted to the smaller size cans, two pounds or less, and when packaged in three pound or larger sizes, the first described process, resulting in a fully pasteurized but not completely sterilized product, is customarily employed.

Products produced at the higher temperature are also stored in a cooler at a temperature between 28° F. and 32° F. for a similar period of eight to sixteen hours, and are then ready for sale and use.

It is to be noted that in no instance is there any necessity for adding additional gelatin, as in all hitherto known similar processes, since the chicke skin, comprising an integral part of the ground chicken breasts employed, provides sufficient natural collagen to form an effective binder.

Therefore, under the present laws of the Pure Food and Drug Administration which requires accurate listing of all the ingredients in such food products, it is necessary only to recite the percentage of chicken breasts, since the skin is considered an integral part thereof and no separate mention of chicken skin, or gelatin, is required.

The essential feature of the instant inventive concept is therefore, the employment of chicken skin, while still comprising an integral component of the chicken breast, as the sole binding agent in the production of a boneless canned chicken product, completely devoid of either the taste or unsightly appearance resulting from the addition of extraneous gelatin.

It is to be understood that the invention as exemplified herein may be practiced otherwise than as described and shown and variations may be made within the bounds of the appended claims without departing from the spirit and scope of this invention.

I claim:
1. A process of producing boneless canned chicken breast loaf which inherently retains its form and is characterized by the complete absence of added artificial binders or other taste contaminating materials, which comprises the steps of:

physically separating the bone from the chicken breasts;

removing the skin from the larger chicken breasts while leaving the skin intact on the smaller chicken breasts;

simultaneously grinding the larger chicken breasts and the smaller chicken breasts with the remaining skin on the smaller chicken breasts to a particle size to allow emulsification, whereby the remaining chicken skin serves as the sole binding material;

simultaneously mixing approximately 2.199 percent of seasoning and preservative materials without the addition of any other binding material;

pressing the resultant emulsified mixture into containers;

evacuating and sealing the containers; and increasing the temperature of the containers and contents thereof to a temperature of at least approximately 170° F. and cooking the contents for between four and one-half and five hours, whereby a resultant food product consisting of approximately 97.8% ground chicken breasts and skin and characterized by the complete absence of extraneous gelatinous material and having a pure chicken taste is achieved.

References Cited

UNITED STATES PATENTS

| 2,822,276 | 2/1958 | Blair et al. | 99—187 |
| 3,024,113 | 3/1962 | Torr | 99—107 |
| 3,124,462 | 3/1964 | Vogel et al. | 99—108 X |

FOREIGN PATENTS 877,695  9/1961  Great Britain.

OTHER REFERENCES

Rose et al.: "The Condensed Chemical Dictionary," 1956, 5th edition, published by Reinhold Publishing Corp., New York, p. 1006, article entitled Sodium Nitrate.

Reddish, "Antiseptics, Disinfectants, Fungicides, and Chemical and Physical Sterilization," 1967, 2nd edition, published by Lea & Febiger, Philadelphia, p. 684, and 685, article entitled Sodium Nitrite.

Webster: "Third New International Dictionary," 1959, published by G. & C. Merrian Company, Springfield, Mass., p. 443, article entitled Collagen and p. 2545, article entitled Vertebrata.

HYMAN LORD, *Primary Examiner.*